(12) United States Patent
Hu

(10) Patent No.: US 7,607,255 B2
(45) Date of Patent: Oct. 27, 2009

(54) MOSQUITO AND FLY KILLER

(76) Inventor: Xilin Hu, No. 17 East Chezhan Road, Linshan Town, Yuyao, Zhejiang (CN)

( * ) Notice: Subject to any disclaimer, the term of this patent is extended or adjusted under 35 U.S.C. 154(b) by 81 days.

(21) Appl. No.: 11/834,253

(22) Filed: Aug. 6, 2007

(65) Prior Publication Data

US 2008/0168701 A1 Jul. 17, 2008

(30) Foreign Application Priority Data

Jan. 16, 2007 (CN) .......................... 2007 1 006744

(51) Int. Cl.
*A01M 1/10* (2006.01)
*A01M 1/04* (2006.01)
*A01M 1/02* (2006.01)
*A01M 1/00* (2006.01)

(52) U.S. Cl. .............................. 43/111; 43/113; 43/138; 43/132.1; 43/107

(58) Field of Classification Search .................. 43/111, 43/113, 107, 132.1, 138, 139
See application file for complete search history.

(56) References Cited

U.S. PATENT DOCUMENTS

| 118,870 | A | * | 9/1871 | Mee | 74/49 |
| 394,205 | A | * | 12/1888 | Neef | 43/113 |
| 503,945 | A | * | 8/1893 | Conard | 43/110 |
| 954,337 | A | * | 4/1910 | Pearce et al. | 43/139 |
| 959,155 | A | * | 5/1910 | Nault | 43/113 |
| 981,459 | A | * | 1/1911 | Moncus | 43/111 |
| 1,029,972 | A | * | 6/1912 | Britton | 43/139 |
| 1,036,331 | A | * | 8/1912 | Plumer | 43/138 |
| 1,071,620 | A | * | 8/1913 | Kingsland | 43/107 |
| 1,164,596 | A | * | 12/1915 | Cox | 43/135 |
| 1,302,972 | A | * | 5/1919 | Rea | 43/139 |
| 1,313,203 | A | * | 8/1919 | Pakeman | 43/107 |
| 1,701,674 | A | * | 2/1929 | Hitoshi | 43/111 |
| 2,737,753 | A | * | 3/1956 | Bittner | 43/113 |
| 2,799,117 | A | * | 7/1957 | Stokes et al. | 43/113 |
| 2,873,551 | A | * | 2/1959 | Misko | 43/111 |
| 3,321,862 | A | * | 5/1967 | Peek | 43/113 |

(Continued)

FOREIGN PATENT DOCUMENTS

EP 87250 A1 * 8/1983

(Continued)

*Primary Examiner*—Darren W Ark
(74) *Attorney, Agent, or Firm*—Global IP Services; Tianhua Gu

(57) ABSTRACT

A kind of mosquito and fly killer, which at least includes round chassis with motor installed, a lure tray driven by motor and equipped on the round chassis, mosquito and fly collection channel and a collection box that connect with the channel that are both set on the lure tray, featuring that there are at least three movable baffles uniformly and vertically insert on the radial direction of the mentioned lure tray, the bottom of movable baffle is placed on the guide rail of the round chassis that consists of at least one ring loop; The mentioned guide rail is set with at least two parallel ring loops, arranged in the round chassis according to their height and fluctuation. Before the movable baffle which enters the lure tray and at least one mosquito and fly collection plate compose of mosquito and fly collection channel, round and smooth transitional section from low to high is set on the two ring-loop guide rails beneath the movable baffle, when movable baffle moves out from the mosquito and fly collection channel with lure tray, round and smooth transitional section from high to low is set on the two ring-loop guide rails beneath the movable baffle. It has advantages of a simple structure, convenient, reliable and safe in use, green & eco-friendly, energy-saving & highly-effective, felicitous structure, good mosquito and fly killing effect, low production cost, pollution-free, etc.

8 Claims, 2 Drawing Sheets

U.S. PATENT DOCUMENTS

| | | | | |
|---|---|---|---|---|
| 3,807,083 A | * | 4/1974 | Smith et al. | 43/138 |
| 4,251,945 A | * | 2/1981 | Tasma | 43/113 |
| 4,314,421 A | * | 2/1982 | Cheong | 43/111 |
| 4,356,656 A | * | 11/1982 | Tasma | 43/113 |
| 4,438,585 A | * | 3/1984 | Slatton | 43/113 |
| 4,519,160 A | * | 5/1985 | McBrayer | 43/113 |
| 4,856,226 A | * | 8/1989 | Taylor | 43/113 |
| 4,944,114 A | * | 7/1990 | Burton et al. | 43/113 |
| 5,003,721 A | * | 4/1991 | Underwood | 43/132.1 |
| 5,209,010 A | * | 5/1993 | Vickery | 43/139 |
| 5,501,034 A | * | 3/1996 | Hazan | 43/138 |
| 6,282,833 B1 | * | 9/2001 | Dashefsky | 43/132.1 |
| 6,574,914 B2 | * | 6/2003 | Smith | 43/113 |
| 6,675,528 B2 | * | 1/2004 | Jablin | 43/107 |
| 6,854,208 B1 | * | 2/2005 | Chuang et al. | 43/113 |
| 6,926,902 B2 | * | 8/2005 | Inoue et al. | 43/132.1 |
| 2003/0000127 A1 | * | 1/2003 | Smith | 43/113 |
| 2004/0128904 A1 | * | 7/2004 | Chen | 43/139 |
| 2005/0060926 A1 | * | 3/2005 | Lee et al. | 43/113 |
| 2007/0011940 A1 | * | 1/2007 | Chen et al. | 43/113 |
| 2007/0056208 A1 | * | 3/2007 | Chen et al. | 43/113 |
| 2007/0074447 A1 | * | 4/2007 | Kalogroulis | 43/107 |

FOREIGN PATENT DOCUMENTS

| | | | | |
|---|---|---|---|---|
| EP | 237453 | A2 | * | 9/1987 |
| EP | 746977 | A1 | * | 12/1996 |
| EP | 1716753 | A1 | * | 11/2006 |
| GB | 2433690 | A | * | 7/2007 |
| JP | 2000324999 | A | * | 11/2000 |
| JP | 2002034303 | A | * | 2/2002 |
| JP | 2004105122 | A | * | 4/2004 |
| JP | 2006223204 | A | * | 8/2006 |

* cited by examiner

MOSQUITO AND FLY KILLER

CROSS REFERENCE TO RELATED PATENT APPLICATION

This patent application claims the Chinese patent application No. 200710066744.3, filing date of Jan. 16, 2007.

FIELD OF THE INVENTION

This invention involves a mosquito and fly killing device that lures mosquitoes and flies to a container and then kill them by eco-friendly attractant and light, and it belongs to the best mosquito and fly killing product that holds the concept of "People's health is wealth and eliminate the epidemic from its source".

BACKGROUND OF THE INVENTION

Mosquito and fly are two of four pests exist among human society, they have strong propagation ability and carry various bacteria in large amount, especially for causing epidemics, they provide the biggest channel for infection of various pathogenic bacteria and seriously affect the health of human body in daily life. In order to kill mosquitoes and flies, various methods are utilized. In the current technologies, there are generally five methods for killing mosquitoes and flies: first is fly bonding paper or plate; second is fly capture cage; third is electric shock fly killing lamp; fourth is mosquito and fly beat; fifth is chemical sprinkling agent; the effect of above five mosquito and fly killing methods is not good, mainly because: firstly, dead flies expose externally, while live flies deliver death information, (for example, "my relative is killed"), result in unsatisfactory fly killing effect; secondly, corpus of exposed dead flies rot and breed viral bacteria for propagation, so as to bring latent dangers to human body; thirdly, killing mosquitoes and flies by chemical agents can also affect environmental sanitation, generate toxic gases, so that the health will be affected. Meanwhile, long-term agent sprinkling has a high cost and can increase drug-immunity of pests.

At present, a pure eco-friendly mechanical fly killer also appears on the market, which utilizes fly attractant as the lure, lures the flies to the rotational roller or tray, carries into the fly capture channel and capture them into the fly collection box. This pure eco-friendly fly killer includes two structures, i.e. drum type and disk type, of which the disk type fly killer has a relatively simple structure, which utilize a fly collection channel that is composed of a rotational material tray connected with motor and a fixed fly collection plate above the material tray, this fly collection channel shall be an open type, and need to have an adjustable switch. As there is no flexible and reliable switch for this, the effect of fly capture will be affected to a certain degree, and the existing fly killer, especially disk type fly killer does not have a rational structure, the fly capture effect is not satisfactory; furthermore, aforesaid fly killer barely has effect on killing mosquitoes, that is to say, currently known fly killer can not be used to kill mosquitoes.

SUMMARY OF THE INVENTION

This invention aims at overcoming aforesaid defects and providing a pure eco-friendly mosquito and fly killer that utilize lure to attract mosquitoes and flies into fly collection box, to capture and kill mosquitoes and flies.

A kind of mosquito and fly killer comprising: a round chassis in which a motor being installed; a lure tray for luring the mosquito and fly driven by said motor being on said round chassis; a collection channel and a collection box connected with said collection channel both being set on the lure tray for collecting mosquito and fly; at least three movable baffles as active door for the collection channel being vertically inserted into slots having radial direction which are distributed on the lure tray equably; a bottom of said movable baffle being placed on a guide rail of said round chassis, said guide rail having at least one ring loop; the movable baffle led by the guide rail moving up and down for closing the collection channel and forcing mosquitoes and flies stayed on the lure tray going into the collection box through the collection channel during the lure tray being turning.

The mentioned guide rail is set with at least two parallel ring loops, arranged in the round chassis according to their height and fluctuation. Before the movable baffle which enters the lure tray and at least one mosquito and fly collection plate compose of mosquito and fly collection channel, round and smooth transitional section from low to high is set on the two ring-loop guide rails beneath the movable baffle, when movable baffle moves out from the mosquito and fly collection channel with lure tray, round and smooth transitional section from high to low is set on the two ring-loop guide rails beneath the movable baffle.

The mentioned lure tray is set with at least two mosquito and fly collection plates upside, of which a transparent phototactic mosquito and fly collection plate exists at the inlet section, while a photophobic mosquito and fly collection plate exists at the outlet section, a fixed baffle is set on the photophobic mosquito and fly collection plate at the outlet section of the mosquito and fly collection channel that is composed of lure tray and aforesaid two mosquito and fly collection plates, and the height of two ring-loop guide rails beneath the fixed baffle is at the lowest position of the whole ring.

The mentioned lure tray is set with at least three mosquito and fly lure boxes upside for placing lure block, and a luminous cover with illuminator and connected with mosquito and fly connection plate is set in the middle of the lure tray.

The mentioned mosquito and fly lure box is respectively set with a movable baffle in between, and is able to move upwards and downwards in the lure box, the mentioned mosquito and fly lure block is formed by plastic-wrapped lures, and a breather hole is set on its surface. The mentioned lure tray is set in the middle sunk face of the round chassis, surrounding of round chassis reveals a convex ring shape, and a mosquito and fly collection box or chamber that connects with mosquito and fly collection channel is set in its ring space.

The mentioned mosquito and fly collection channel and mosquito and fly collection box or chamber in the surrounding ring space of the round chassis is set with the mosquito and fly outlet with mesh cover in between.

The mentioned round chassis is set with power switch on its surrounding convex ring, and movable switch door is also set.

This invention mainly utilizes constantly rotational disk with lures, attracts and kills mosquitoes and flies through switching the flexible and reliable fly collection channel, featuring a simple structure, convenient, reliable and safe in use, green & eco-friendly, energy-saving & highly-effective, felicitous structure, good mosquito and fly killing effect, low production cost, pollution-free, etc.

DETAIL DESCRIPTION OF THE INVENTION

Figure 1:
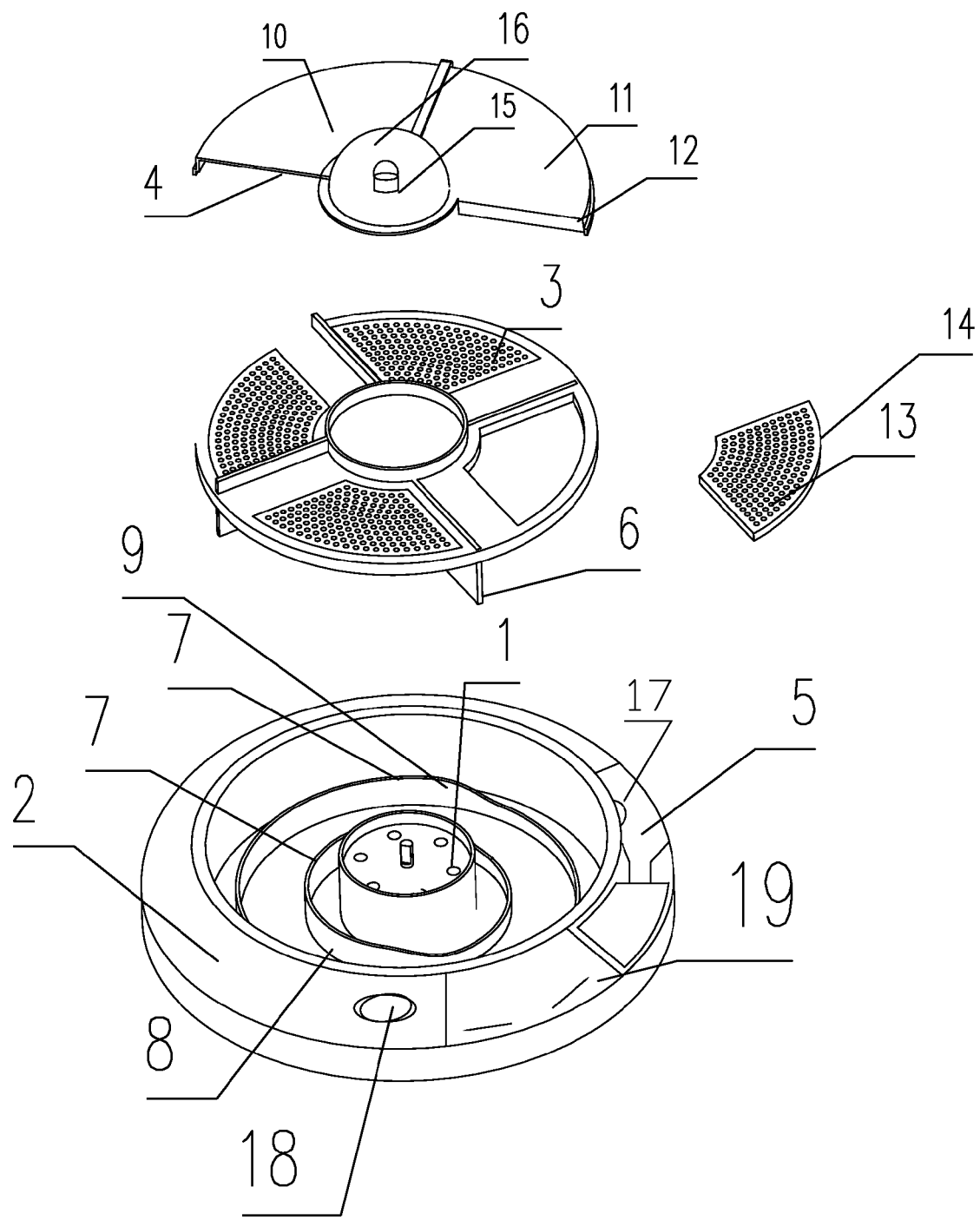
FIG. 1 is an exploded perspective view of a mosquito and fly killer in accordance with the present invention.
Figure 2:
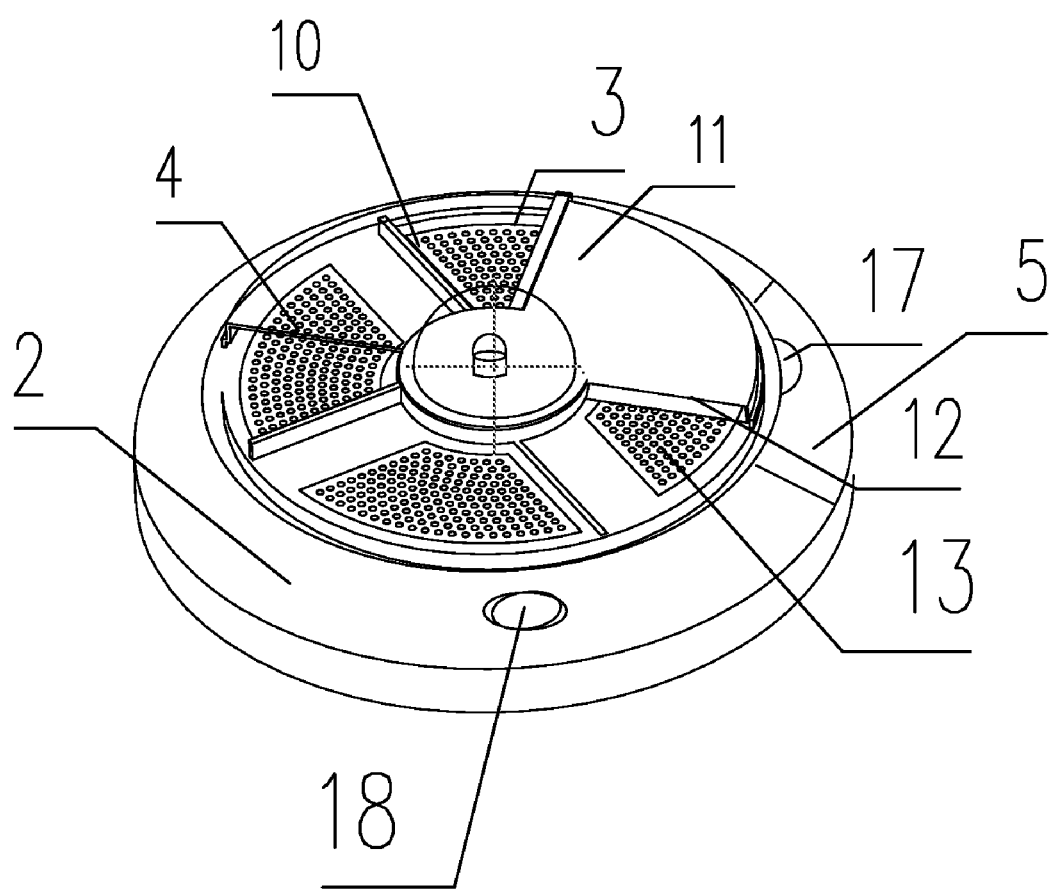
FIG. 2 an assembled perspective view of a mosquito and fly killer in accordance with the present invention.

This invention will be introduced in details hereunder by combining with the figures:

As FIG. 1 and FIG. 2 show, this invention mainly includes round chassis 2 with motor 1 installed, a lure tray 3 driven by motor 1 and equipped on the round chassis 2, mosquito and fly collection channel 4 and a collection box 5 that connect with the channel 4 that are both set on the lure tray 3, featuring that there are at least three movable baffles 6 uniformly and vertically insert on the slot having radial direction on the mentioned lure tray 3, the bottom of movable baffle 6 is placed on the guide rail 7 of the round chassis 2 that consists of at least one ring loop.

As shown in FIG. 1, the mentioned guide rail 7 is set with at least two parallel ring loops, arranged in the round chassis 2 according to their height and fluctuation. Before the movable baffle 6 which enters the lure tray 3 and at least one mosquito and fly collection plate compose of mosquito and fly collection channel 4, round and smooth transitional section from low to high is set on the two ring-loop guide rails 7 beneath the movable baffle 6, when movable baffle 6 moves out from the mosquito and fly collection channel 4 with lure tray 3, round and smooth transitional section from high to low is set on the two ring-loop guide rails 7 beneath the movable baffle 6.

The mentioned lure tray 3 is set with at least two mosquito and fly collection plates that connected each other upside, of which a transparent phototactic mosquito and fly collection plate 10 exists at the inlet section, while a photophobic mosquito and fly collection plate 11 exists at the outlet section, a fixed baffle 12 is set on the photophobic mosquito and fly collection plate at the outlet section of the mosquito and fly collection channel 4 that is composed of lure tray 3 and aforesaid two mosquito and fly collection plates 10,11, and the height of two ring-loop guide rails 7 beneath the fixed baffle 12 is at the lowest position of the whole ring, so as to constitute a mosquito and fly collection channel with flexible opening and closing effect.

There are four movable baffles 6 uniformly and vertically insert into the radial direction slot of the lure tray 3, which separate the lure tray 3 into four spaces that can place mosquito and fly lure block 13 or called as mosquito and fly lure box; the mentioned mosquito and fly lure block 13 is formed by plastic-wrapped lures and a breather hole 14 set on its surface, which have the flavor of lures give off from the breather hole 14 and lures mosquitoes and flies stay on the plastic wrapped surface of mosquito and fly lure block 13. The aforesaid mosquito and fly lure block 13 can be changed conveniently, thus can be more eco-friendly and sanitary.

The mentioned lure tray 3 is set with a luminous cover 16 with illuminator 15 and connected with mosquito and fly connection plate in the middle, leading to light-lured effect.

As showed in the figure, lure tray 3 mentioned in this invention is set in the middle sunk face of the round chassis 2, surrounding of round chassis 2 reveals a convex ring shape, and a mosquito and fly collection box 5 or chamber that connects with mosquito and fly collection channel 4 is set in its ring space; the mentioned mosquito and fly collection channel 4 and mosquito and fly collection box 5 or chamber in the surrounding ring space of the round chassis 2 is set with the mosquito and fly outlet with mesh cover 17 in between.

Round chassis 2 mentioned in this invention is set with power switch 18 on its surrounding convex ring and movable door switch 19 is also set.

In order to let the movable baffle 6 flexibly move out of the mosquito and fly collection channel 4, the mosquito and fly collection channel 4 mentioned in this invention is set with at least one arc block that transits from inner plate face to the lower face of the fixed baffle 12 at its inner side of photophobic mosquito and fly collection plate 11, as movable baffle 6 slides on the surface of guide rail 7, in order to reduce the sliding resistance, the lower end of the movable baffle 6 mentioned in this invention is set with a pulley.

When used normally, driven by motor 1, lure tray 3 rotates slowly, drives movable baffle 6 on lure tray 3 meanwhile for synchronous movement. When the movable baffle 6 is about to enter mosquito and fly collection channel 4, it rises by the upward stress of guide rail 7. After entering mosquito and fly collection channel 4, the movable baffle 6 is driven up to the position where the mosquito and fly collection channel 4 is, and closes it. At this time, if mosquitoes or flies enter, mosquitoes and flies will be driven to enter into mosquito and fly collection box 5, with the internal movement of the movable baffle 6; when movable baffle 6 is about to move out from the mosquito and fly collection channel 4, the guide rail 7 displays a falling trend, movable baffle 6 lowers at the same time and beneath the lower face of the fixed baffle 12. When basically keeping parallel with the upper face of the lure tray 3, it will be moved out from mosquito and fly collection channel 4.

This invention is characterized by environment-friendly, energy-saving, continuous capture of mosquitoes and flies every day, and the captured flies will stifle and starve and can be cleanly disposed. So that its cost is lower than chemical agents by 10 to 20 times, and a great deal of capital can be saved for the country and consumers.

What is claimed is:

1. A mosquito and fly killer comprising:
    a round chassis in which a motor is installed;
    a lure tray for luring a mosquito and a fly, the lure tray being driven by said motor and being on said round chassis;
    a collection channel and a collection box connected with said collection channel, the collection channel and collection box are set on the lure tray for collecting the mosquito and fly;
    at least three movable baffles acting as active doors for the collection channel, the at least three movable baffles being vertically inserted into radial slots which are distributed on the lure tray equally;
    a bottom of each of said at least three movable baffles being placed on a guide rail of said round chassis, said guide rail comprising at least one ring loop;
    each of said at least three movable baffles being guided by the guide rail and moving up and down for closing the collection channel and forcing mosquitoes and flies staying on the lure tray into the collection box through the collection channel during turning of the lure tray.

2. The mosquito and fly killer of claim 1, wherein the guide rail comprising at least one ring loop further comprises two parallel ring loops inside the round chassis, the two parallel ring loops have a round and smooth transitional section from low to high for raising the at least three movable baffles up from a level of the lure tray to a level of a collection plate which at least partially defines the collection channel and the two parallel ring loops have a round and smooth transitional section from high to low for descending the at least three movable baffles down from the level of the collection plate to the level of the lure tray during turning of the lure tray.

3. The mosquito and fly killer of claim 2, wherein the collection plate which is above said lure tray is comprised of a transparent phototactic collection plate and a photophobic collection plate, the collection plate and the lure tray define said collection channel, a fixed baffle is connected with the photophobic collection plate at an exit of said collection channel, a lowest point of the two parallel ring loops is under and opposite to the fixed baffle.

4. The mosquito and fly killer of claim 1, wherein at least three mosquito and fly lure boxes having lure blocks are placed on the lure tray, a luminous cover with an illuminator connected with the collection plate is set on a middle of the lure tray.

5. The mosquito and fly killer of claim 4, wherein between two adjacent mosquito and fly lure boxes of said at least three mosquito and fly lure boxes the at least three movable baffles move upwards and downwards, the at least three mosquito and fly lure blocks being formed as plastic-wrapped lures, and breather holes are set on surfaces of the at least three mosquito and fly lure blocks.

6. The mosquito and fly killer of claim 5, wherein the lure tray is set in a middle sunken face of said round chassis, said round chassis comprises a shell with a convex ring shape, the collection box connected with the collection channel is set in the shell.

7. The mosquito and fly killer of claim 6, wherein between the collection channel and collection box a mesh cover is set thereto.

8. The mosquito and fly killer of claim 6, wherein a power switch and a movable door switch are set on the shell of the round chassis.

* * * * *